United States Patent
Lee et al.

(10) Patent No.: US 7,587,529 B2
(45) Date of Patent: Sep. 8, 2009

(54) METHOD FOR CONTROLLING MEMORY IN MOBILE COMMUNICATION SYSTEM

(75) Inventors: Eun-Ok Lee, Suwon-si (KR);
Young-Mo Gu, Suwon-si (KR);
Sang-Hyo Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 68 days.

(21) Appl. No.: 11/649,181

(22) Filed: Jan. 3, 2007

(65) Prior Publication Data
US 2007/0180162 A1    Aug. 2, 2007

(30) Foreign Application Priority Data
Jan. 3, 2006    (KR) .................. 10-2006-0000722

(51) Int. Cl.
*G06F 13/00*    (2006.01)
(52) U.S. Cl. .................. 710/35; 710/33; 710/34; 710/36; 375/29; 375/260
(58) Field of Classification Search ......... 710/33–36; 375/259, 260
See application file for complete search history.

(56) References Cited

U.S. PATENT DOCUMENTS

| 5,457,557 | A * | 10/1995 | Zarem et al. .............. 398/116 |
| 6,665,536 | B1 * | 12/2003 | Mahany ................. 455/432.1 |
| 7,173,922 | B2 * | 2/2007 | Beach ..................... 370/338 |

FOREIGN PATENT DOCUMENTS

KR    1020020078290    10/2002

* cited by examiner

*Primary Examiner*—Tammara Peyton
(74) *Attorney, Agent, or Firm*—The Farrell Law Firm, LLP

(57) ABSTRACT

Disclosed is a method for controlling a memory in a mobile communication system. The method includes receiving certain frame control information by a Data Receiver Block (DRB) from a MAP decoder, forming a burst descriptor by the DRB by using the frame control information, and transferring the burst descriptor to a Low Medium Access Control (LMAC), and allocating a memory by the LMAC based on bursts according to the burst descriptor.

4 Claims, 7 Drawing Sheets

METHOD FOR CONTROLLING MEMORY IN MOBILE COMMUNICATION SYSTEM

PRIORITY

This application claims priority to an application entitled "Method For Controlling Memory In Mobile Communication System" filed in the Korean Intellectual Property Office on Jan. 3, 2006 and assigned Ser. No. 2006-722, the contents of which are incorporated herein by reference.

BACKGROUND OF THE INVENTION

1. Field of the Invention

The present invention relates generally to a mobile communication system, and more particularly to an apparatus and a method for controlling a memory in a mobile communication system.

2. Description of the Related Art

Wireless communication systems have been developed to handle the case where a fixed wired network cannot be connected to a User Equipment (UE). Such a wireless communication system has evolved into a mobile communication system with the development of technology. The representative system of the mobile communication system is a cellular system.

The cellular system connects a node B performing communication with a UE through a wireless channel to a wired network. The representative system of such a cellular system includes a cellular mobile communication system using a Code Division Multiple Access (CDMA) scheme.

The cellular system has been developed in order to basically provide voice communication, but systems capable of providing various data services have recently emerged. Further, the amount of data requested by users has increased, requiring higher transmission speeds of large quantities of data. Accordingly, research has been conducted in order to support such requirements in a cellular system using a CDMA scheme.

In the meantime, in order to provide users with mass storage data at a high speed, research into a system using an Orthogonal Frequency Division Multiplexing (OFDM) scheme, which is different from a CDMA scheme, has been actively conducted. Many discussions have occurred to commercialize a system using an OFDM scheme. An Institute of Electrical and Electronics Engineers (IEEE) 802.16 standardization group, which belongs to an international standardization body, is pursuing the establishment of an IEEE 802.16d standard in order to provide static UEs with a wireless broadband Internet service. The OFDM scheme may be defined as a two dimensional access method combining Time Division Access (TDA) technology and Frequency Division Access (FDA) technology. An IEEE Std 802.16™-2004 uses an Orthogonal Frequency Division Multiple Access (OFDMA) scheme in which an entire band is divided into subcarriers, some of which are grouped to form subchannels, and each of the subchannels is allocated to users. Thus, all UEs within a system use subchannels including subcarriers widely spread over an entire band. As a result, a system (OFDMA system) using the OFDMA scheme transmits data through some subchannels constituting a particular subchannel.

In an OFDMA system, all users connected to a node B share and use a common channel, and an interval, in which each user utilizes a channel, is allocated by a node B in each frame. Accordingly, the node B classifies access information as upward and downward access information, allocates the upward and downward access information in front of each frame, and broadcasts the allocated access information to all users.

In such an OFDMA system, access information is transmitted in each frame, which includes such information as a modulation scheme and a coding rate. FIG. 1 illustrates the conventional structure of a frame including an uplink and a downlink in an OFDMA system.

In FIG. 1, a vertical axis denotes a plurality of subchannel numbers 147 (S, S+1, S+2, . . . , S+L), and a horizontal axis (time axis) denotes the number 145 of an OFDMA symbol.

Referring to FIG. 1, the frame includes a DownLink (DL) 149 and an UpLink (UL) 153 divided through time division, and one OFDMA frame includes a plurality of OFDMA symbols (e.g. 12 OFDMA symbols). Further, one OFDMA symbol includes a plurality of subchannels (e.g. L subchannels). Such an OFDMA system denotes a communication system which aims to acquire frequency diversity gain by distributing entire subcarriers used in the system, specifically, data subcarriers, to an entire frequency band.

In the DL 149, a preamble 111 for synchronization of a transmission-side UE and a reception-side node B is disposed at the head thereof, broadcast data information including a Frame Control Header (FCH) 113, a DL_MAP 115 and an UL-MAP 117 is disposed after the preamble 111, and downlink bursts 121, 123, 125, 127 and 129 are included in symbols.

In the UL 153, preambles 131, 133 and 135 for synchronization of the transmission-side UE and the reception-side node B exist before uplink bursts 137, 139 and 141, respectively, and a ranging subchannel 143 for adjusting node B receive power exists. Information about the positions and allocation of the uplink bursts 137, 139 and 141 and the downlink bursts 121, 123, 125, 127 and 129 is transmitted from the node B to the UE through the DL_MAP 115 and the UL-MAP 117, and the UE variably receives a subchannel, in which a frequency and a symbol are combined, through the received information in each frame so as to communicate with the node B. That is, the UE uses different subchannels in each frame instead of a static subchannel.

A conversion process from the DL 149 to the UL 153 is performed during a first Transmit/receive Transition Gap (TTG) 151, and a conversion process from the UL 153 to the DL 149 is performed during a second Receive/transmit Transition Gap (RTG) 155. After the conversion processes, a preamble is provided so that the UE can acquire system synchronization.

In a conventional mobile communication system using an OFDM scheme, information about one frame is transmitted from a node B to a UE through a MAP message. The MAP message may be classified as a DL-MAP message for transferring downlink information or an UL-MAP message for transferring uplink information. In the MAP, the smallest unit reporting a piece of information will be referred to as Information Element (IE). Each IE is distinguished by a Downlink Interval Usage Code (DIUC) and an Uplink Interval Usage Code (UIUC) of four bits. Herein, DIUCs 0 to 12 and UIUCs 1 to 10 include information of a burst which is the smallest unit having transmission characteristics such as a modulation scheme and a forward error correction scheme.

FIG. 2 illustrates the construction of a receiver in a conventional mobile communication system using an OFDM scheme. Hereinafter, a memory control method in the conventional mobile communication system will be described with reference to FIG. 2.

FIG. 2 shows the simplification of a control path through which a MAP decoder 201 transfers information required by a demodulator 203 and a channel decoder 205, and a data path through which data transferred to a Low Medium Access Control (LMAC) 207 via the demodulator 203 and the channel decoder 205 is stored in a memory through information reported by a Data Receiver Block (DRB) 209, wherein the memory can be accessible by software.

A downlink burst IE includes a DIUC, an OFDMA symbol offset, a subchannel offset, boosting, the number of OFDMA symbols, the number of subchannels and a repetition coding indication field. The MAP decoder 201 extracts a burst allocated to a UE, adds burst indices in a sequence of 0, 1, 2, etc., according to bursts, and then transfers corresponding information to the demodulator 203 and the channel decoder 205. That is, since a UE can receive a plurality of bursts within one frame, the MAP decoder 201 extracts only burst-based information about a burst corresponding to the UE from the bursts, and then transfers the extracted information to blocks requiring the information. In the case of a downlink, if the channel decoder 205 performs channel decoding by using the information (i.e. location, modulation/coding, boosting and repetition) received from the MAP decoder 201, and transfers corresponding data to the LMAC 207, the LMAC 207 classifies the received data according to MAC messages. The LMAC 207 performs Header Check Sum (HCS) decoding according to MAC messages. If the situation requires, the LMAC 207 performs Cyclic Redundancy Check (CRC) check and decryption, and forms a MAC Packet Data Unit (PDU) descriptor for the results from the CRC check and decryption. Such MAC PDU descriptor and MAC messages are stored in a corresponding memory 211 based on bursts according to burst descriptors previously made by the DRB 209.

FIG. 3 illustrates one example of the burst descriptor.

FIG. 3 shows an RxBstInitAddr register 301, and a burst descriptor transferred from the DRB 209 to the LMAC 207, wherein the RxBstInitAddr register 301 is required when the LMAC 207 reads a burst descriptor and the DRB 209 writes the burst descriptor.

The burst descriptor includes a *NextBurstPtr 303, a *PduPtr 305, an F 307, a O 309, a Burst_Len 311, an L 313, a CurNum 315, an R 317 and a TotNum 319. The *NextBurstPtr 303 reports the storage position of a subsequent burst descriptor, and the *PduPtr 305 reports the storage position of a MAC PDU included in a current burst. The F 307 functions as a valid burst indicator in which 0 is written by the DRB 209, and is updated by the LMAC 207 as 1 if all MAC PDUs in a burst are transmitted. The O 309 is a current burst queue overrun flag reported as 1 while the LMAC 207 overwrites data in an existing memory when there is no longer available memory. The Burst_Len 311 indicates the entire length of MAC PDUs, which are included within a corresponding burst, by the byte, the L 313 reports that the current burst is the last burst, and the CurNum 315 indicates a current burst number. The R 317 is a reserved field currently not used, and the TotNum 319 denotes the number of entire bursts.

If the DRB 209 initially writes the first burst descriptor address in the RxBstInitAddr register 301, and connects a subsequent burst descriptor to a current chain for reporting, the LMAC 207 stores data corresponding to a burst in the memory 211 while following the RxBstInitAddr register 301 and the *NextBurstPtr 303.

Since the DRB 209 allocates a memory with a static size of each burst without separate frame information, it is impossible to efficiently use the memory. Since the burst size is not limited, and 64 DL bursts at maximum can be used in the use of a frame according to the standard, unexpected problems may occur when using the memory with a static size when there is a change in a profile including the number of bursts, the burst size and the ratio of an uplink/downlink. For example, when a size corresponding to a burst with a maximum size available for a UE is allocated to all bursts, a large memory exceeding the capacity of a system may be required, or the maximum value in the number of processible bursts may decrease.

SUMMARY OF THE INVENTION

Accordingly, the present invention has been made to solve the above-mentioned problems occurring in the prior art, and it is an object of the present invention to provide an apparatus and a method for controlling a memory in a mobile communication system, which can efficiently control the memory when an LMAC classifies and processes burst-based data, which is received from a channel decoder, based on a MAC PDU, and stores the processed data in the memory.

It is another object of the present invention to provide an apparatus and a method for controlling a memory in a mobile communication system, which control the memory in order to efficiently cope with various changes in a profile including, for example, the ratio of a downlink/uplink, length according to bursts, and the number of bursts.

It is further another object of the present invention to provide an apparatus and a method for controlling a memory in a mobile communication system, which control the memory through frame control information received from a MAP decoder.

In accordance with the present invention, there is provided a method for controlling a memory in a mobile communication system, the method including receiving certain frame control information by a DRB from a MAP decoder, forming a burst descriptor by the DRB by using the frame control information, and transferring the burst descriptor to an LMAC, and allocating a memory by the LMAC based on bursts according to the burst descriptor.

In accordance with the present invention, there is provided an apparatus for controlling a memory in a mobile communication system, the apparatus including a DRB for receiving frame control information from a MAP decoder, forming a burst descriptor by using the frame control information, and transferring the burst descriptor to an LMAC, and the LMAC for allocating a memory based on bursts according to the burst descriptor.

In accordance with the present invention, there is provided a method for controlling a memory in a mobile communication system, the method including receiving certain frame control information by a DRB from a MAP decoder, forming a burst descriptor by the DRB by using the frame control information, and transferring the burst descriptor to an LMAC, determining by the LMAC whether a valid burst indicator has been set to have a value of 1 in a burst indicator for a previous frame, and when the valid burst indicator has been set to have a value of 1, transferring by the DRB MAC PDUs to an upper element, and setting the valid burst indicator to have a value of 0.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description of the present invention, a detailed description of known functions and configuration incorporated herein will be omitted for the sake of clarity and conciseness. Terms described in the following description are defined by taking functions thereof into consideration, so they may vary according to the intentions of a user and an operator or depending on custom. Accordingly, the terms must be defined based on the entire contents of the present invention.

Figure 4:
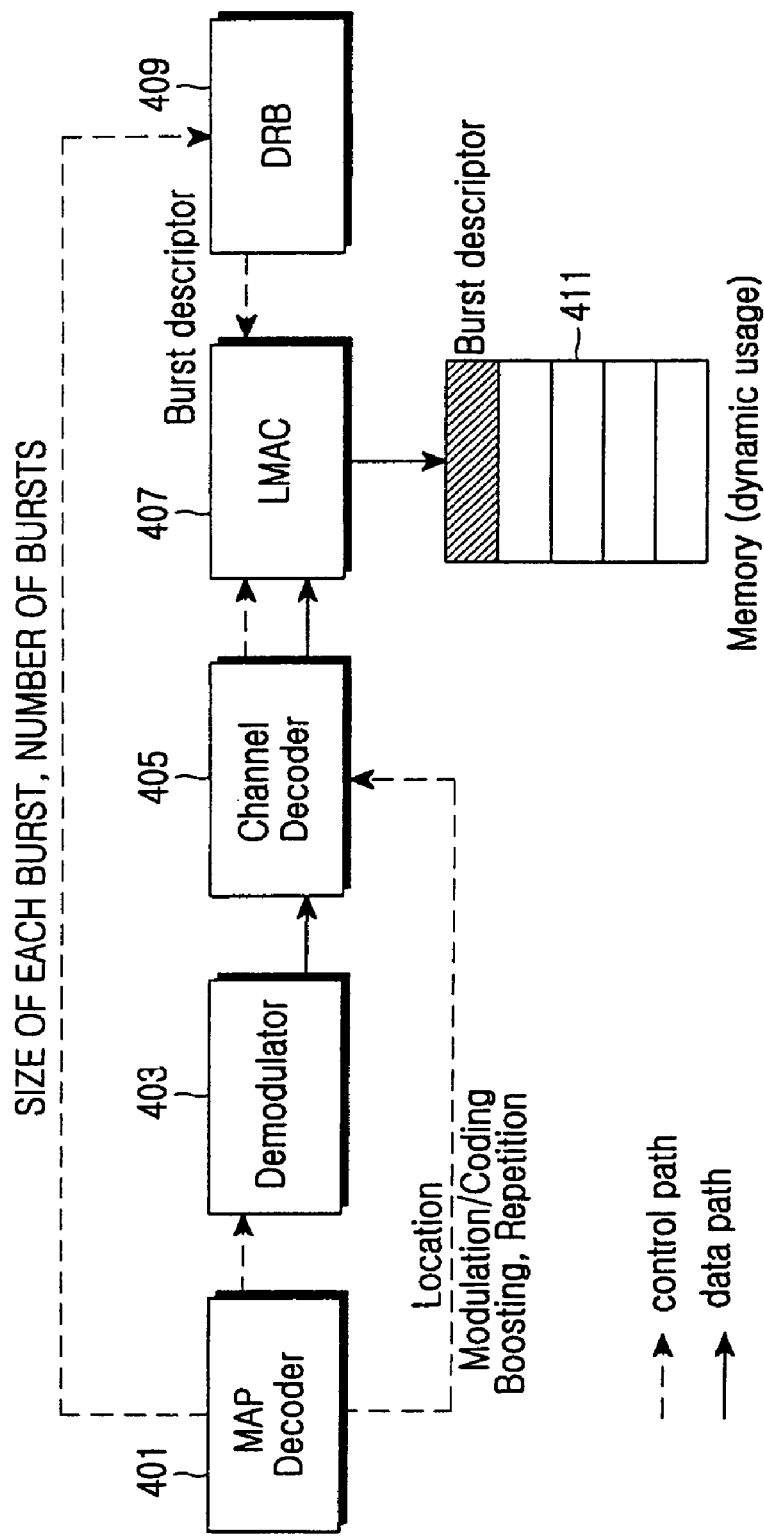
FIG. 4 illustrates the construction of a receiver in a mobile communication system according to the present invention.

FIG. 4 illustrates the construction of a receiver in a mobile communication system according to the present invention. Hereinafter, a memory control method in the mobile communication system will be described with reference to FIG. 4.

Referring to FIG. 4, if the MAP decoder 401 transfers information about size of each burst and the number of bursts to the DRB 409, the DRB 409 forms a burst descriptor by using the information, and transfers the burst descriptor to the LMAC 407. The MAP decoder 401 extracts modulation/decoding information through mapping with a DIUC corresponding to a burst by using stored information obtained by decoding a Downlink Control Descriptor (DCD) in a software block (not shown), and becomes aware of frame control information about the size of data existing in a burst, etc., through the field regarding the number of OFDMA symbols, the number of subchannels and repetition coding indication. If the MAP decoder 401 transmits the frame control information to the DRB 409, it is possible to dynamically use the memory because the DRB 409 can become aware of the size of each burst and number of bursts.

In terms of a data path between the channel decoder 405 and the LMAC 407, a sequence in which data is transferred to the LMAC 407 according to bursts after channel decoding may be different from a burst sequence indexed by the MAP decoder 401 due to the position and size of a burst. Thus, in the present invention, the DRB 409 forms burst descriptors illustrated in FIGS. 5 and 6.

Figure 5:
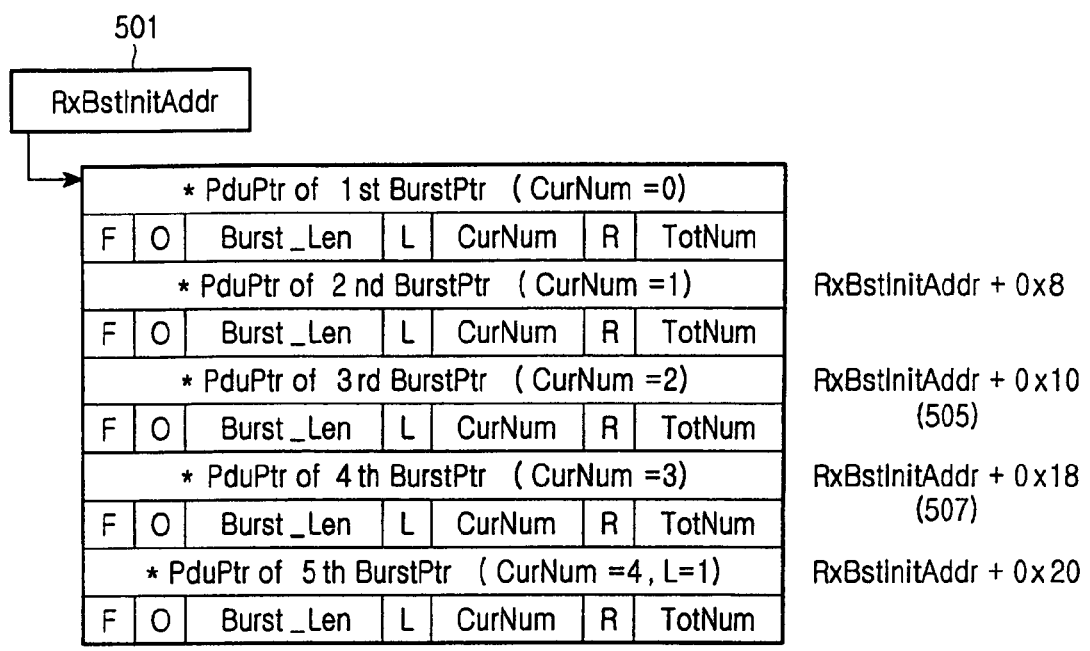
FIG. 5 illustrates an example of the structure of a burst descriptor according to a first embodiment of the present invention.

FIG. 5 illustrates an example of the structure of a burst descriptor according to a first embodiment of the present invention. That is, FIG. 5 illustrates an example of the structure of a burst descriptor available for embodying a dynamic memory in FIG. 4.

Figure 1:
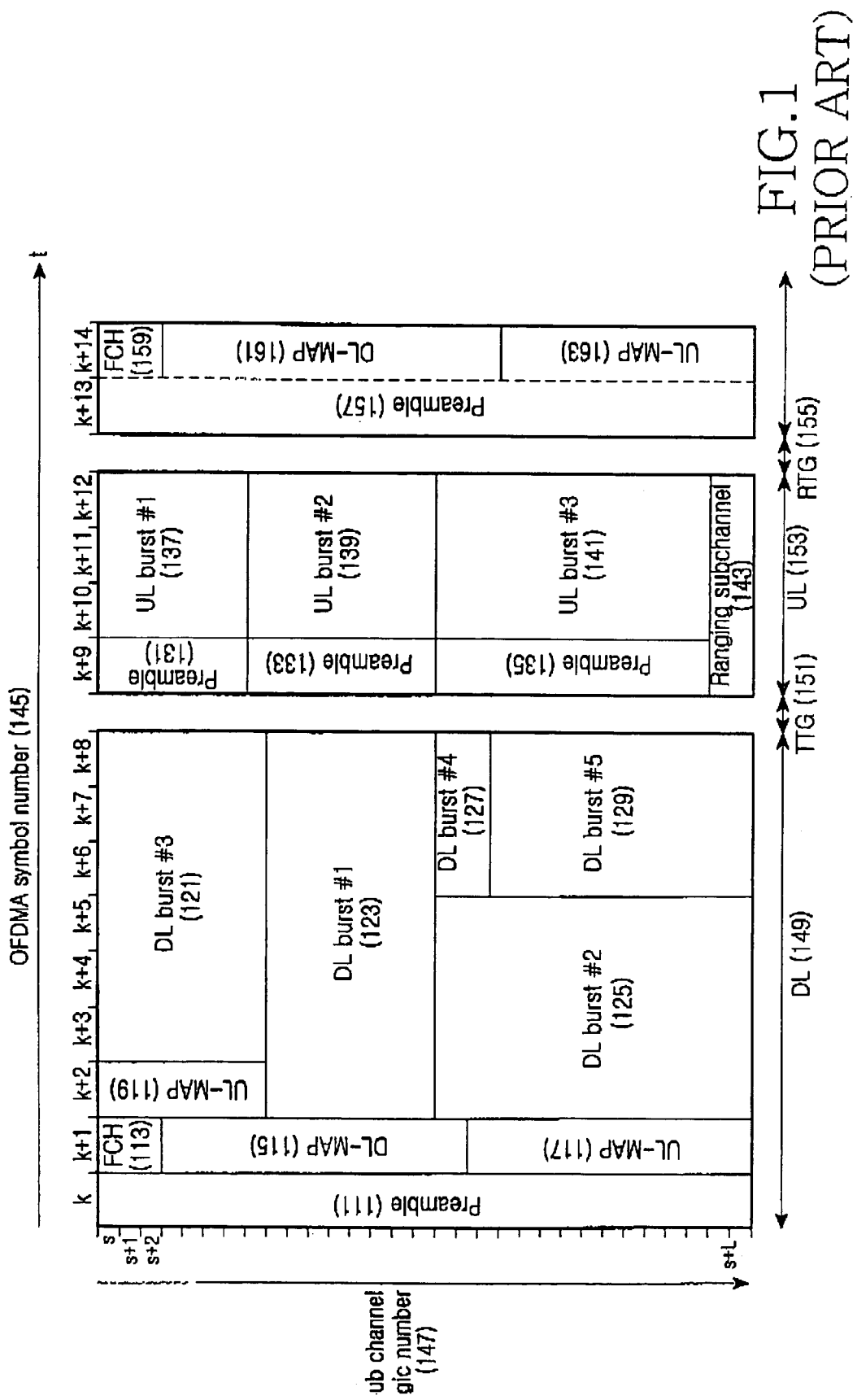
FIG. 1 illustrates the conventional structure of a frame in an OFDMA system.
Figure 2:
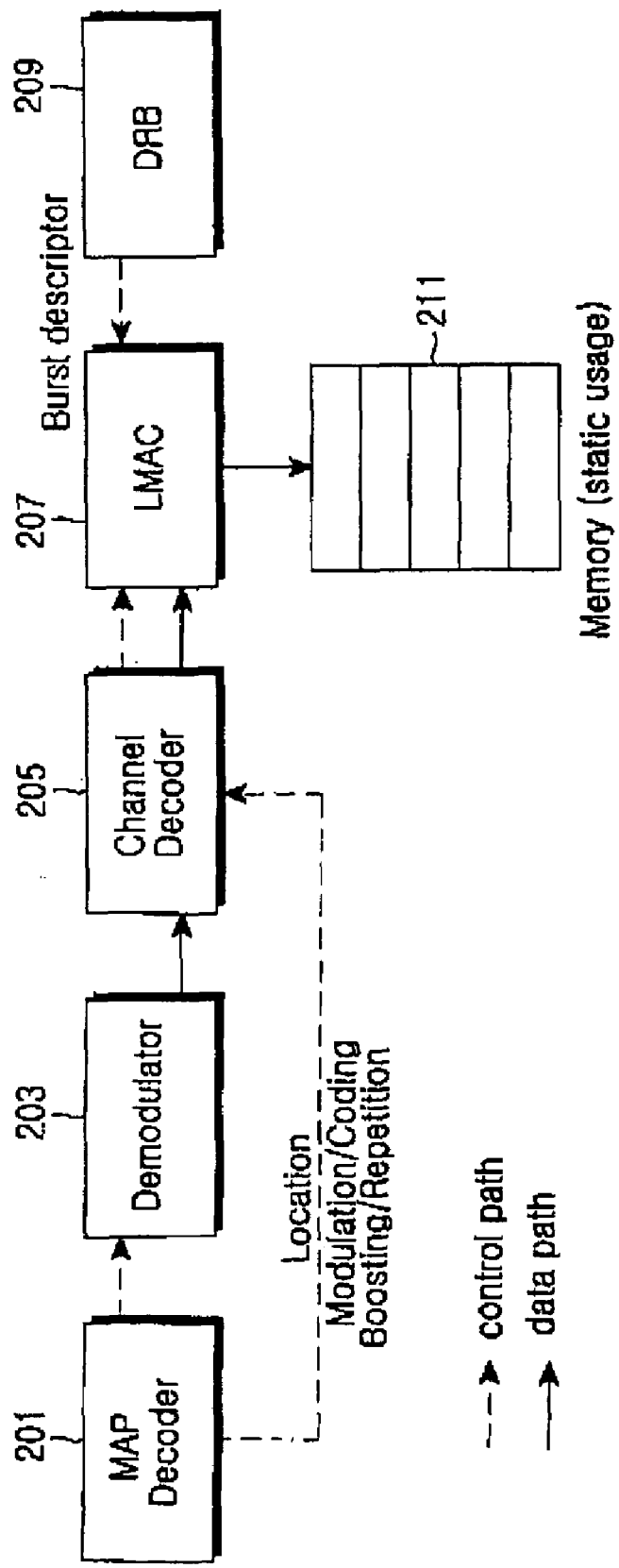
FIG. 2 illustrates the construction of a receiver in a conventional mobile communication system.
Figure 3:
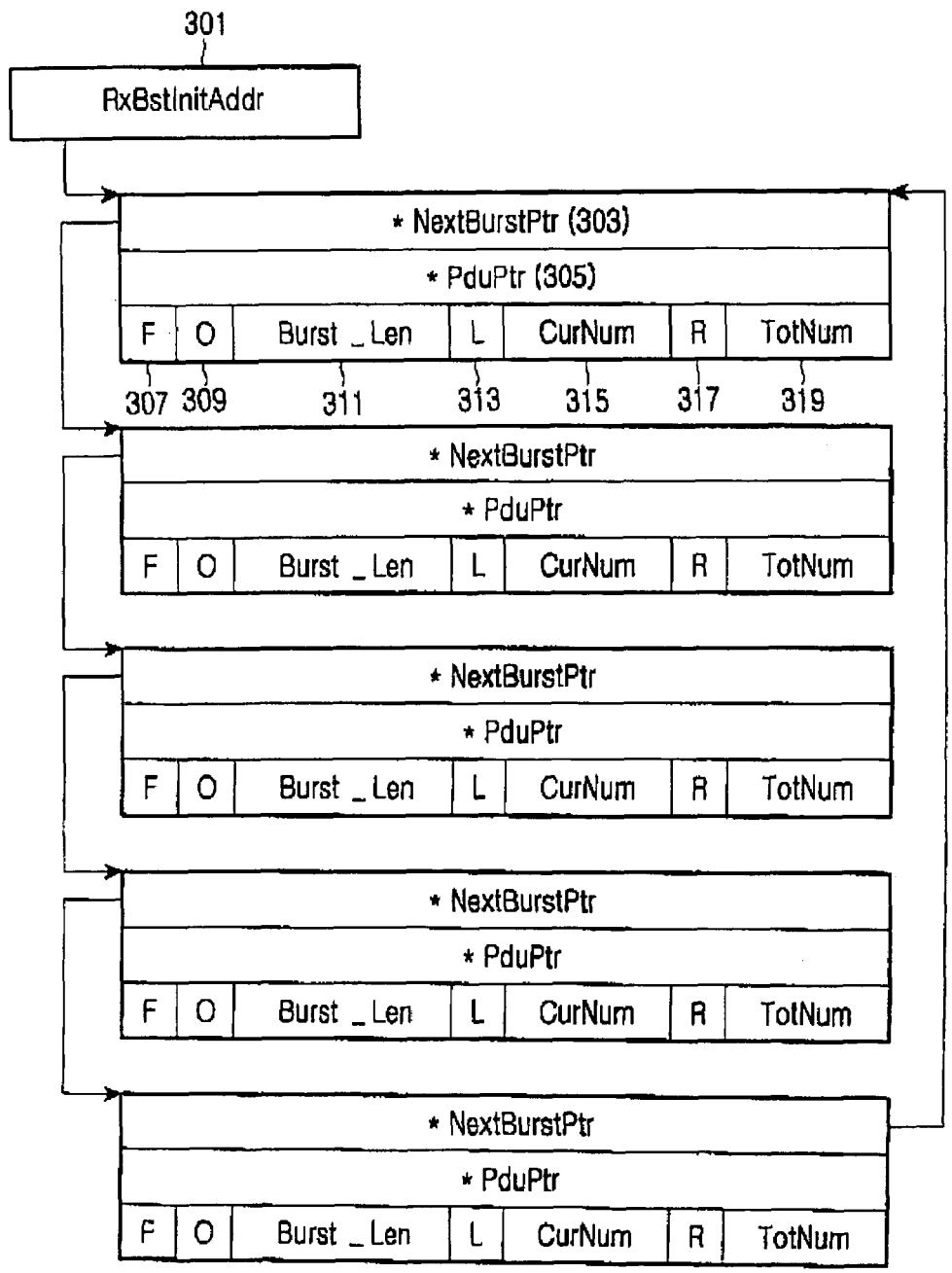
FIG. 3 illustrates a conventional burst descriptor.

FIG. 5 shows an RxBstInitAddr register 501, and a burst descriptor transferred from the DRB 409 to the LMAC 407, wherein the RxBstInitAddr register 501 is required when the LMAC 407 reads a burst descriptor and the DRB 409 writes the burst descriptor. FIG. 5 does not include the *NextBurstPtr 303 reporting the storage position of a subsequent burst descriptor, as compared to FIG. 3.

Since the burst descriptor has a static size for one burst, and the LMAC 407 receives a burst index from the channel decoder 405, the burst index being transferred from the MAP decoder 401, the LMAC 407 can become aware of the storage position of the first MAC PDU of a burst descriptor corresponding to the burst index. For example, if a burst having a burst index of 2 has been transferred from the channel decoder 405, the LMAC 407 finds an address corresponding to an (RxBstInitAddr+0 X 10) 505, and stores data of the third burst in the position of a value of corresponding to the address.

Further, if a burst having a burst index of 3 has been transferred from the channel decoder 405, the LMAC 407 finds an address corresponding to an (RxBstInitAddr+0 X 18) 507, and stores data of the fourth burst in the position of a value of corresponding to the address.

Herein, it is necessary to consider a case in which current frame data is not processed until subsequent frame data is received. Accordingly, if the DRB 409 receives the length and the number of bursts allocated to a present frame from the MAP decoder 401, the DRB 409 checks an F field updated by the LMAC 407 in a burst descriptor for a previous frame, and determines the storage position of a burst descriptor for the present frame. Further, if the DRB 409 informs the LMAC 407 of a start position through the RxBstInitAddr register 501, the LMAC 407 reads the corresponding register 501 and can become aware of the start position of a burst descriptor for the present frame.

Figure 6:
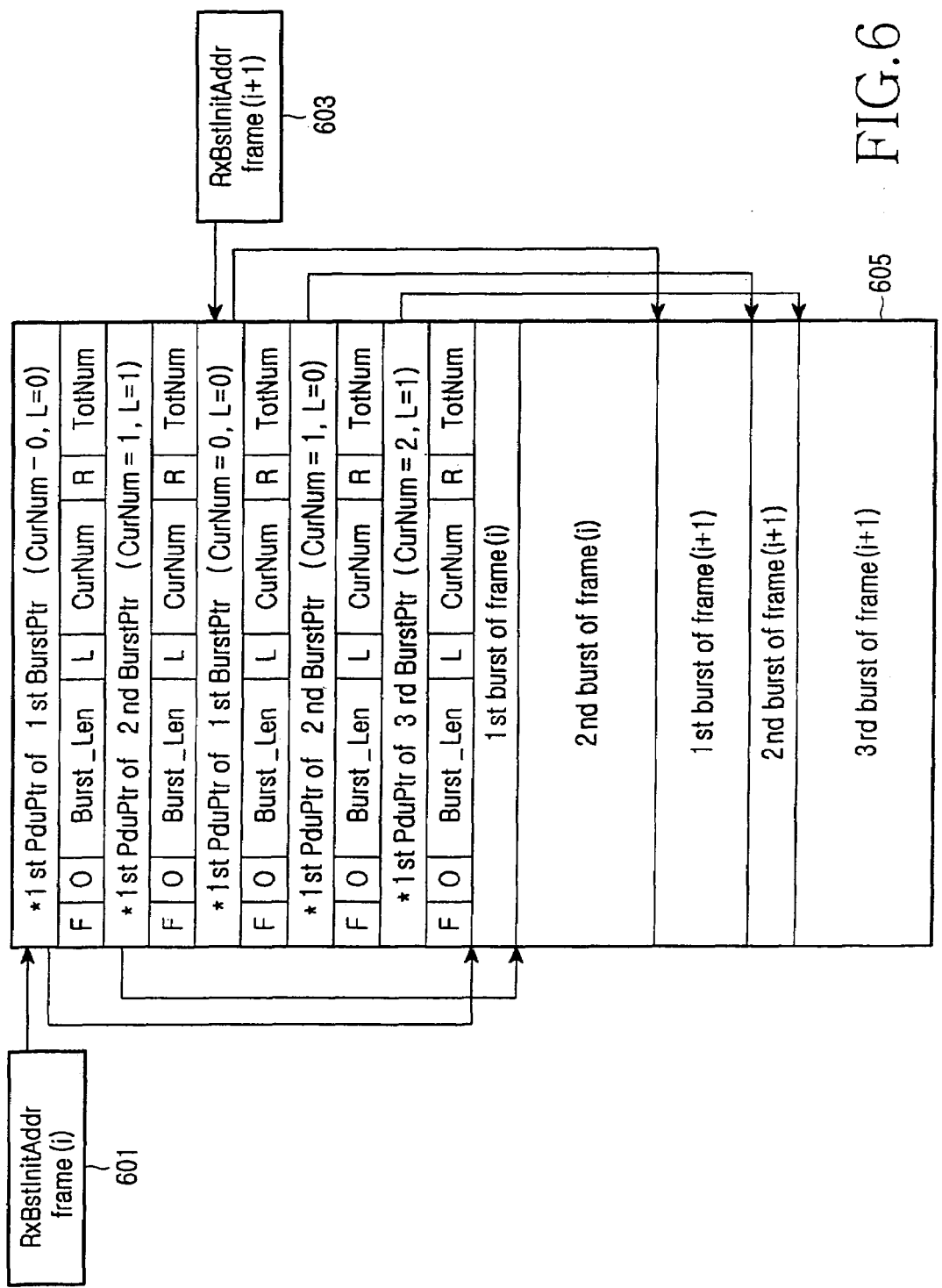
FIG. 6 illustrates an example of the structure of a burst descriptor according to a second embodiment of the present invention.

FIG. 6 illustrates an example of the structure of a burst descriptor according to a second embodiment of the present invention. That is, FIG. 6 illustrates an example of multi-frame use, i.e. an example in which two bursts are allocated to a frame i and three bursts are allocated to a frame (i+1).

FIG. 6 shows RxBstInitAddr registers 601 and 603, and a burst descriptor transferred from the DRB 409 to the LMAC 407, wherein the RxBstInitAddr registers 601 and 603 are required when the LMAC 407 reads a burst descriptor and the DRB 409 writes the burst descriptor.

The registers 601 and 603 are updated according to frame control information and F field values, which are received from the MAP decoder 401 to the DRB 409, in each frame. FIG. 6 does not include the *NextBurstPtr 303 reporting the storage position of a subsequent burst descriptor, as compared to FIG. 3. Further, it is possible to use a multi-frame instead of one frame, as compared to FIG. 5.

The DRB 409 informs the LMAC 407 of the address of the first burst descriptor in the present frame through the registers 601 and 603, the LMAC 407 receives a burst index from the channel decoder 405, the burst index being transferred from the MAP decoder 401, so that the LMAC 407 can become aware of the storage position of the first MAC PDU of a burst descriptor corresponding to the burst index. For example, if a burst having a burst index of 2 has been transferred from the channel decoder 405, and the RxBstInitAddr register 603 stores the address of the first burst index corresponding to the frame (i+1), the LMAC 407 stores the data of the third burst in the third burst of the frame (i+1) 605.

Hereinafter, a detailed operation will be described considering a case in which the current frame data is not processed until the subsequent frame data is received.

If the DRB 409 receives the length and the number of bursts allocated to a present frame from the MAP decoder 401, the DRB 409 checks an F field updated by the LMAC 407 in a burst descriptor for a previous frame, and determines the storage position of a burst descriptor for the present frame.

Further, if the DRB 409 informs the LMAC 407 of a start position of an $i^{th}$ frame through the RxBstInitAddr register 601, the LMAC 407 reads the corresponding register 601 and can become aware of the start position of a burst descriptor for the present frame.

Furthermore, if the DRB 409 informs the LMAC 407 of a start position of an $(i+1)^{th}$ frame through the RxBstInitAddr (i+1) register 603, the LMAC 407 reads the corresponding register 603 and can become aware of the start position of a burst descriptor for the present frame.

Figure 7:
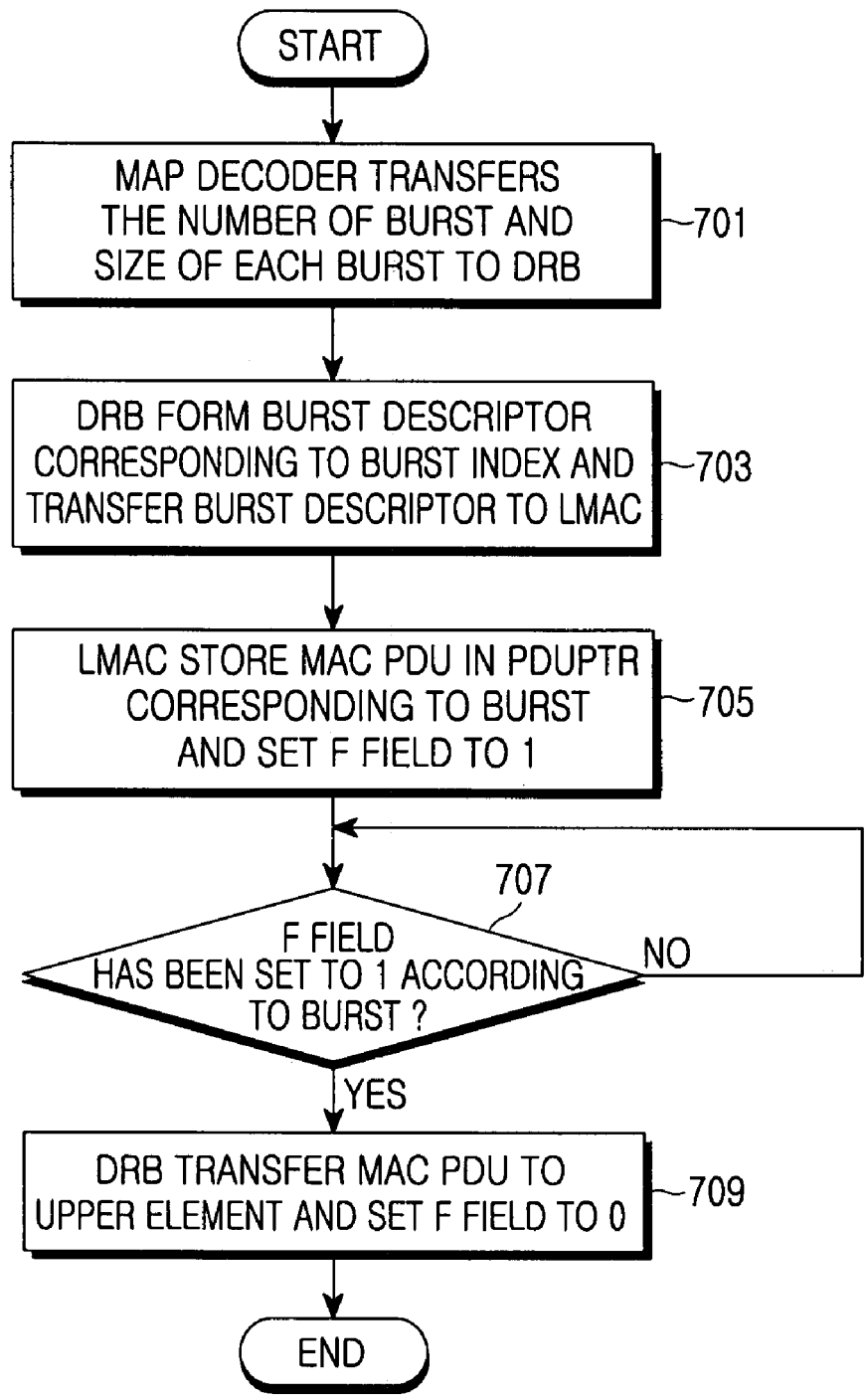
FIG. 7 illustrates a memory control method in a mobile communication system according to the present invention.

Hereinafter, the memory control method in the mobile communication system according to an embodiment of the present invention will be described with reference to FIG. 7.

First, in step 701, the MAP decoder 401 calculates sizes of each burst, and transfers the calculated results to the DRB 409. In step 703, the DRB 409 forms a burst descriptor corresponding to a burst index, and transfers the burst descriptor to the LMAC 407. In step 705, the LMAC 407 stores MAC PDUs in a pduPtr corresponding to a burst, and sets an F field to have a value of 1. The valid burst indicator field F indicates whether the DRB 409 has taken the data stored in the LMAC 407. In step 707, the DRB 409 determines whether the F field has been set to have a value of 1 for each burst. When the F field has been set to have a value of 1 for all bursts, the DRB 409 transfers MAC PDUs to an upper element and sets the F field to have a value of 0.

According to the present invention, the following representative effect is obtained.

That is, a block controlling a memory dynamically allocates the memory according to bursts by using frame control information (the size of each burst and the number of bursts) directly transferred from a MAP decoder, so that it is possible to form a flexible system, which is unlimited in the number of bursts which can be covered by the system, with minimum memory usage.

Although preferred embodiments of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for controlling a memory in a mobile communication system, the method comprising the steps of:
    receiving certain frame control information by a Data Receiver Block (DRB) from a MAP decoder;
    forming a burst descriptor by the DRB by using the frame control information, and transferring the burst descriptor to a Low Medium Access Control (LMAC); and
    storing a burst in a memory by the LMAC according to the burst descriptor,
    wherein storing the burst in a memory by the LMAC further comprises storing MAC Packet Data Units (PDUs) in a PduPtr corresponding to the burst and setting a valid burst indicator to have a value of 1.

2. The method as claimed in claim 1, further comprising determining, by the DRB, whether the valid burst indicator updated by the LMAC has been set to have a value of 1 for each burst, transferring MAC PDUs to an upper element when the valid burst indicator has been set to have a value of 1 for all bursts, and setting the valid burst indicator to have a value of 0.

3. An apparatus for controlling a memory in a mobile communication system, the apparatus comprising:
    a Data Receiver Block (DRB) for receiving frame control information from a MAP decoder, forming a burst descriptor by using the frame control information, and transferring the burst descriptor to a Low Medium Access Control (LMAC); and
    the LMAC for storing a burst in a memory according to the burst descriptor,
    wherein, when the burst is stored in the memory according to the burst descriptor, the LMAC stores MAC Packet Data Units (PDUs) in a PduPtr corresponding to the burst and sets a valid burst indicator to have a value of 1.

4. The apparatus as claimed in claim 3, wherein the DRB determines whether the valid burst indicator updated by the LMAC has been set to have a value of 1 for each burst, transfers MAC PDUs to an upper element when the valid burst indicator has been set to have a value of 1 for all bursts, and sets the valid burst indicator to have a value of 0.

* * * * *